Christopher Grindle
INVENTOR.

June 26, 1962  C. GRINDLE  3,040,785
PIG PARLOR CLEANER
Filed Aug. 17, 1959  2 Sheets-Sheet 2
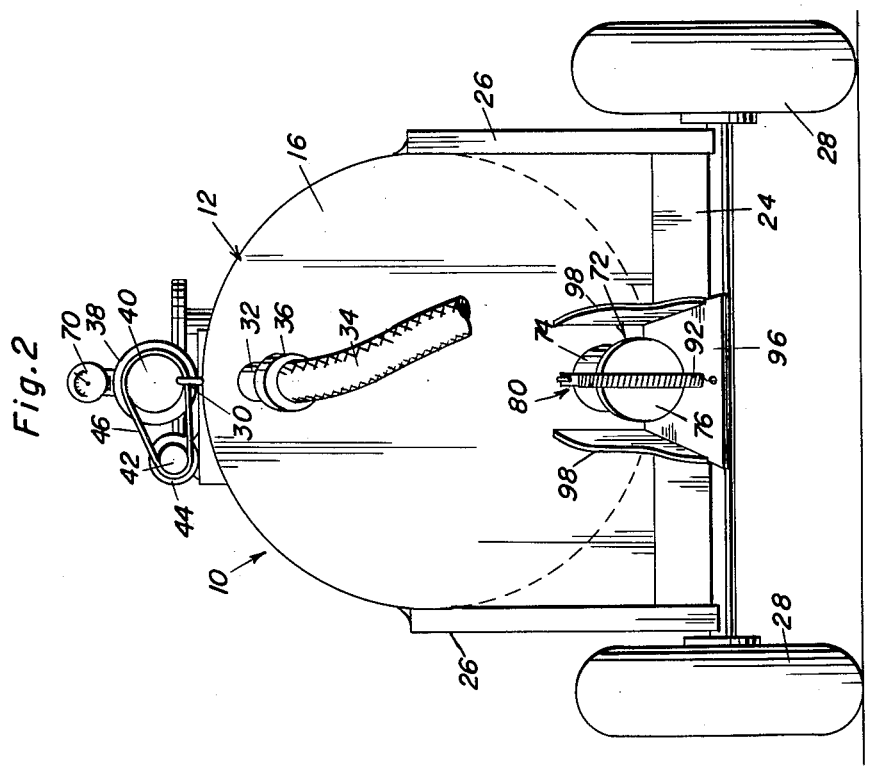
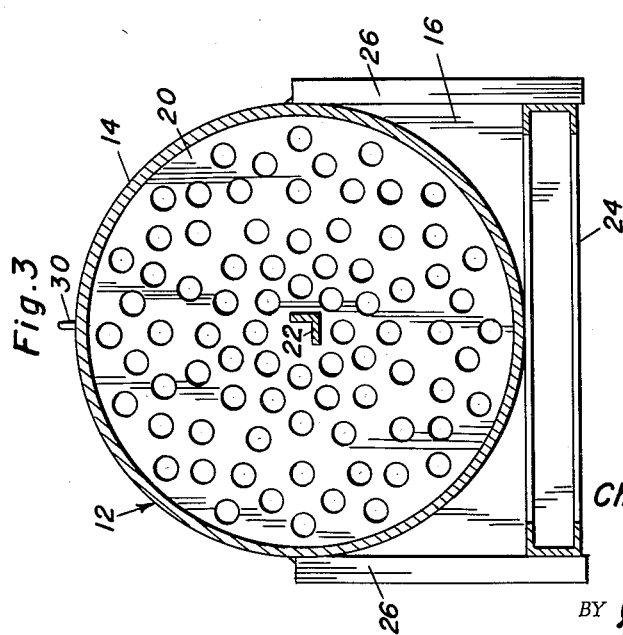
Christopher Grindle
INVENTOR.

United States Patent Office 3,040,785
Patented June 26, 1962

3,040,785
PIG PARLOR CLEANER
Christopher Grindle, R.R. 1, Box 79, Morristown, Ind.
Filed Aug. 17, 1959, Ser. No. 834,057
2 Claims. (Cl. 141—18)

This invention relates in general to new and useful improvements in farm accessories, and more specifically to a pig parlor cleaner.

Until recently the disposal of manure, especially in large confinement feeding operations, represented an urgent, unsolved problem to many hog raisers. However, it is proposed to both clean the pig parlor and to make use of the manure therefrom in a single operation. A holding tank, preferably of poured concrete or concrete blocks, is built adjacent to the pig parlor. This storage facility normally is located near the center of the pig parlor so that a gutter from the pig parlor will run into it from both ends. It is normally desirable that the holding tank be of sufficient capacity to hold the accumulated manure from a typical 100 pig operation for about three weeks. A sturdy cover, including a trap door, should be placed over the holding tank. The trap door is for the purpose of accommodating a hose used to pump out the liquid from the holding tank.

The present invention relates to an apparatus for removing the manure bearing liquid from the holding tank and distributing such liquid and manure onto the fields, so that the manure, heretofore wasted, may be used to build up the land.

Another object of the invention is to provide an apparatus for cleaning holding tanks of pig parlors and for distributing the manure bearing liquid removed therefrom, the apparatus including an enlarged tank having a discharge pipe at the bottom thereof and an intake fitting at the upper end thereof, and pump means carried by the tank for drawing manure bearing liquid into the tank from the holding tank.

A further object of the invention is to provide a novel apparatus for handling and distributing manure bearing liquid, such as that received from holding tanks of pig liquid, the apparatus including a storage tank which may be mounted for mobility, the storage tank being provided with suitable pump means for drawing manure bearing liquid from a pig parlor holding tank, and a suitable discharge, including a spreader plate, whereby the manure bearing liquid may be evenly distributed over the ground.

A still further object of this invention is to provide a solid bearing liquid handling system, which system includes a tank having an intake fitting to which an intake hose may be connected, and there being provided a vacuum pump for producing a vacuum within the tank so that the suction in the intake hose will draw in liquid carrying relatively heavy solids, such as manure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a rear end view of the apparatus of FIGURE 1 and shows the specific details of the discharge means thereof; and FIGURE 3 is a fragmentary transverse sectional view taken substantially upon the plane indicated by the section line 3—3 of FIGURE 1 and shows the internal construction of the tank.

Figure 1:
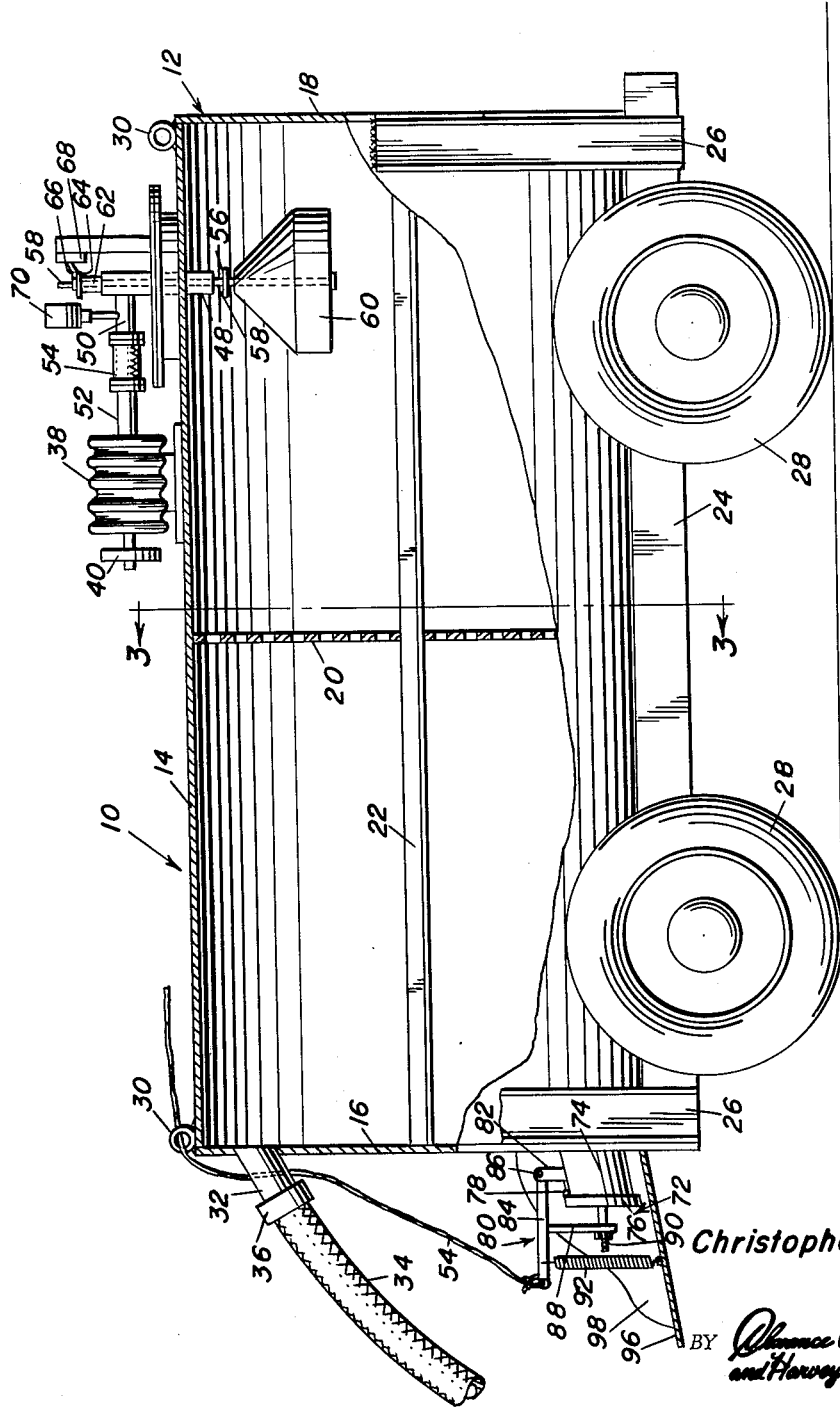
FIGURE 1 is a side elevational view of the invention with a portion of the tank thereof broken away and shown in section in order to clearly illustrate the details of the internal construction thereof and a float operated actuator.

Referring now to the drawings in detail, it will be seen that there is illustrated the apparatus, which is the subject of this invention, the apparatus being referred to in general by the reference numeral 10 and being intended for removing manure bearing liquid from a storage pit or holding tank of a pig parlor and distributing such manure bearing liquid to a field as a fertilizer. The apparatus 10 includes an elongated tank, generally referred to by the numeral 12. A typical tank will be formed of a cylindrical body 14 and a pair of end plates 16 and 18. The plates 16 and 18 are suitably secured, such as by welding, to the ends of the body 14. The body 14 is reinforced by a centrally located transverse baffle 20. The ends 16 and 18 are reinforced against inward buckling by a longitudinal frame member 22, which frame member passes through and is secured to the baffle 20, as is best illustrated in FIGURE 3. A suitable frame structure 24 underlies the body 14. Upright channel members 26 are disposed at opposite ends of the tank 12 and secure the same to the frame 24. The channel members 26 also serve to reinforce and support the tank 12.

If desired, the frame 24 may be supported by suitable wheel assemblies 28, such as are illustrated in FIGURES 1 and 2. On the other hand, the frame 24 may be directly mounted on a truck bed to facilitate the handling of the apparatus 10. In order to facilitate the handling of the apparatus 10, the upper portion of the body 14 is provided with lifting eyes 30 at the opposite ends thereof.

The end wall 16 may be considered the rear end of the tank 12. The end wall 16 has secured to the upper central portion thereof a downwardly sloping intake fitting 32 which is in the form of a section of pipe. A non-collapsing intake hose 34 is removably connected to the intake fitting 32 by means of a coupling 36. Solid bearing liquid is drawn into the tank 12 through the intake hose 34 and the intake fitting 32 by producing a vacuum within the tank 12. This is accomplished by means of a vacuum pump 38. The vacuum pump 38 may be of any desired type, including that utilized in conjunction with existing milkers on a farm. The vacuum pump 38 has a drive pulley 40 which is coupled to a pulley 42 of an electric motor 44 by a drive belt 46. The electric motor 44 may be connected to any suitable source of electrical power about the pig parlor from which the manure bearing liquid is being drawn. However, if desired, other types of power unit, including a small internal combustion engine, may be provided for operating the pump 40. At this time it is pointed out that the pump 40 may be selectively mounted on the top of the tank 12, or at one end thereof.

The upper portion of the tank body 14 is provided with a pipe 48 through which air in the tank 12 is exhausted. The pipe 48 is provided with a fitting 50 which is connected to a fitting 52 of the vacuum pump 38 by means of a flexible hose connection 54. The pipe 48 opens down into the upper part of the tank 12. The lower end of the pipe 48 is selectively closed by a valve member 56 when the fluid within the tank 12 has reached a predetermined level.

The valve member 56 is carried by an actuator rod 58 which has mounted on the lower end thereof a float 60. When the liquid within the tank 12 reaches a predetermined level, the float 60 moves upwardly with the resulting upward movement of the actuator rod 58. The valve member 56 engages the lower end of the pipe 48 closing the pipe and thus discontinuing the communication of the vacuum pipe 38 with the interior of the tank 12.

At this time it is pointed out that the actuator rod 58 extends through the upper end of the fitting 48 through a sealed fitting 62 thereof. The actuator rod 58 is provided adjacent the upper end thereof with a collar 64 which will engage an actuator 66 of a control switch 68 for the electric motor 44. Thus when the rod 58 moves upwardly to move the valve member 56 to a closed position, the collar 64 will trip the actuator for the control switch 68 and open the control switch 68 to discontinue the operation of the pump 38.

In order to determine the operation of the vacuum pump 38, a suitable gauge 70 is provided. The gauge 70 is illustrated as being mounted on the fitting 50 although it may be mounted on other parts of the piping between the vacuum pump 38 and the interior of the tank 12. The vacuum gauge 70 will give an accurate determination of the operation of the vacuum pump 38.

The critical part of any liquid manure system is to have a pump that will successfully transfer the manure from the storage facility to the portable tank, such as the tank 12. When the solids carried by the liquid are particularly heavy, the vacuum type pump, such as the vacuum pump 38 has proved to be very effective in the field, handling liquid containing up to 40% solids, and such difficult materials as ground corn cobs used for bedding.

After the manure bearing liquid is placed in the tank 12, the tank 12 is moved out to the field which is to be fertilized. The spreading of the manure bearing liquid is accomplished through a discharge unit, generally referred to by the numeral 72. The discharge unit 72 includes a discharge pipe 74 secured to the lower portion of the rear end wall 16. The discharge pipe 74 is normally closed by a discharge gate member 76 which is hingedly connected to the discharge pipe 74 by a hinge 78. A suitable linkage, generally referred to by the numeral 80, is provided for moving the control gate member 76 between opened and closed positions. The linkage 78 includes a support arm assembly 82 which projects upwardly from the discharge pipe 74 and which has a lever 84 pivotally connected thereto by means of a pivot pin 86. The lever 84 has a depending arm 88 which is, in turn, connected to a fitting 90 carried by the gate member 76. When the lever 84 is moved upwardly in a clockwise direction, as viewed in FIGURE 1, the gate member 76 is moved to an open position. Upward movement of the lever 80 is resisted by a coil spring 92 which extends upwardly from a part of the structural apparatus of the invention and is connected to a rear portion of the lever 84. The spring 92 normally retains the gate member 76 in a discharge pipe closing position.

In order that the gate member 76 may be swung to an open position from a remote point, a pull line 94 is connected to the extreme rear end of the lever 84. The pull line 94 may pass through any suitable guides, including the eyes 30, and is anchored to the tractor near the operator's seat thereof. In this manner, the operator of the vehicle or tractor which is bringing about the movement of the apparatus 10 may open the gate member 76 when desired.

A distributor plate 96 in the form of an inclined chute of generally U-shaped cross section is fixed on the tank end wall 16 and underlies the discharge pipe 74 for spreading the manure bearing liquid discharged thereon from the tank 12 through the discharge pipe 74. The spreader plate 96 is provided with upstanding side plates 98 which also serve as braces for the spreader plate 96. As is best illustrated in FIGURE 2, the spreader plate 96 is flared outwardly and rearwardly.

From the foregoing, it will be readily apparent that there has been devised a novel apparatus which includes a tank and pump means of a nature that permits manure bearing liquid to be pumped from holding tanks of pig parlors, the apparatus including a vacuum pump which enables the handling of liquid bearing a large quantity of solids. The apparatus is also so constructed whereby the manure bearing liquid may be readily distributed over farm lands to function as fertilizer therefor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An apparatus for handling liquid manure comprising a wheel-supported tank, suction means connected to the tank for drawing liquid manure thereinto, a generally U-shaped spreader chute on the tank, a discharge spout on the tank within the confines of the chute and communicating therewith for discharging the liquid manure thereinto, and means for controlling the discharge of the manure, said tank being cylindrical and including a circular apertured surge plate at an intermediate point, and a longitudinal brace bar of angle iron mounted centrally in the tank and having its ends affixed to the end walls thereof, said brace bar extending through the surge plate and affixed thereto.

2. An apparatus for handling liquid manure comprising a wheel-supported tank, suction means connected to the tank for drawing liquid manure thereinto, a generally U-shaped spreader chute on the tank, a discharge spout on the tank within the confines of the chute and communicating therewith for discharging the liquid manure thereinto, and means for controlling the discharge of the manure, said means including a vertically swingable valve hingedly mounted on the upper portion of the spout for seating on the outlet end thereof, a post rising from the spout, a vertically swingable lever pivotally mounted on the post and operatively connected to the valve, an operating cable connected to the lever for opening the valve, and a coil spring in the chute having one end anchored to the bottom thereof and its other end connected to the lever for closing the valve, said tank being cylindrical and including a circular apertured surge plate at an intermediate point, and a longitudinal brace of angle iron mounted centrally in the tank and having its ends affixed to the end walls thereof, said brace bar extending through the surge plate and affixed thereto.

References Cited in the file of this patent

UNITED STATES PATENTS

| | | |
|---|---|---|
| 1,892,519 | Schotten | Dec. 27, 1932 |
| 1,925,120 | Tamminga | Sept. 5, 1933 |
| 2,160,477 | Kramer | May 30, 1939 |
| 2,675,947 | Wynn | Apr. 20, 1954 |
| 2,822,957 | Johnson | Feb. 11, 1958 |

FOREIGN PATENTS

| | | |
|---|---|---|
| 722,617 | Great Britain | Jan. 26, 1955 |